United States Patent [19]
Drehman et al.

[11] 3,761,539
[45] Sept. 25, 1973

[54] PRETREATMENT OF DEHYDROGENATION FEEDS WITH GROUP VIII METAL OXIDES

[75] Inventors: Lewis E. Drehman; Floyd E. Farha, Jr.; Marvin M. Johnson, all of Bartlesville, Okla.

[73] Assignee: Phillips Petroleum Company, Bartlesville, Okla.

[22] Filed: June 16, 1971

[21] Appl. No.: 153,821

[52] U.S. Cl. .......... 260/683.3, 208/88 R, 208/137 R
[51] Int. Cl. .............................................. C07c 5/18
[58] Field of Search.................. 260/683.3; 208/137, 208/88

[56] References Cited
UNITED STATES PATENTS
2,500,146   3/1950   Fleck et al. .......................... 260/137
3,531,543   9/1970   Clippinger et al. .............. 260/683.3

FOREIGN PATENTS OR APPLICATIONS
454,668   4/1941   Canada ........................... 260/683.3

OTHER PUBLICATIONS
Kalichevsky "Chemical Refining of Petroleum" 1962 Page 34.

Primary Examiner—Delbert E. Gantz
Assistant Examiner—J. M. Nelson
Attorney—J. Arthur Young et al.

[57] ABSTRACT

A process for removing dehydrogenation catalyst poisons from paraffin and steam feedstreams by pretreating the feedstreams with Group VIII metal oxides. Undesirable silica is removed from turbo-electric generator steam feedstreams through the process of pretreating said steam with Group VIII metal oxide.

7 Claims, No Drawings

PRETREATMENT OF DEHYDROGENATION FEEDS WITH GROUP VIII METAL OXIDES

This invention relates to a process for removing catalyst poisons from dehydrogenation feedstreams. In another aspect, the invention relates to an improved dehydrogenation process. In yet another aspect, the invention relates to a process for removing silica from steam.

It is conventional in the dehydrogenation of paraffins to utilize catalysts such as nickel-kieselguhr, chromium oxide-alumina, zinc oxide alumina, platinum-alumina, and the like. Additionally, a platinum catalyst on a support such as zinc aluminate is known to be one possible catalyst for the dehydrogenation of paraffins in the presence of steam and oxygen. Specifically, the catalytic effect of many Group VIII metals is known when deposited on a support of alumina, silica, Group II aluminate spinel, and the like; and alkalized by the use of alkali or alkaline earth metal.

The group of metals referred to herein are as classified in the Periodic Table published by the Chemical Rubber Company's Handbook of Chemistry and Physics, 45th Edition (1964), page B-2. Dehydrogenation of a hydrocarbon feedstream by contacting same with a fixed bed of catalyst material is known in the art. It is further known in the art that feedstocks to be dehydrogenated often contain relative small amounts of materials which are poisonous to the dehydrogenation catalyst, resulting in frequent shutdowns in order to regenerate or replace the poisoned catalyst. We have now discovered an advantageous process for promoting longer life in dehydrogenation catalysts whereby the feedstream to be dehydrogenated is passed before contact with the dehydrogenation catalyst into contact with a Group VIII metal oxide.

Accordingly, it is an object of this invention to provide a process for removing dehydrogenation catalyst poisons from dehydrogenation feedstreams. It is another further object of our invention to provide a process for extending the useful life of a dehydrogenation catalyst system. It is a further object of our invention to provide a process for removing silica from steam through the use of Group VIII metal oxides. Other aspects, objects and the several advantages of our invention will be apparent from this description, and the appended claims.

According to our invention, a dehydrogenation catalyst is given longer process life by pretreating dehydrogenation feedstreams with Group VIII metal oxides. In the dehydrogenation of paraffin-steam feedstreams, catalyst deactivation is readily deferred through the use of a Group VIII metal oxide guard chamber. For example, zinc aluminate, promoted with platinum and tin, is a satisfactory catalyst for the dehydrogenation of paraffins in the presence of steam. In two tests directed toward determining the life of the aforementioned catalyst, it was determined and demonstrated that the catalysts had a life of about 4½ months. An accelerated life test was established in which a small portion of the catalyst was operated under severe conditions. At these conditions, a small portion of the catalyst became almost completely deactivated with 72 hours. It was discovered that a bed of Group VIII metal oxides, for example, iron oxide ($Fe_2O_3$) immediately ahead of the catalyst bed removed poisons from the paraffin-steam feedstreams in such efficiency that the catalysts showed virtually no deactivation for at least 288 hours. These findings are recorded herein below in Examples I–III and Table I.

The catalytic dehydrogenation system of this invention is particularly well adapted to the dehydrogenation of paraffins comprised of aliphatic compounds having from 2 to about 12 carbon atoms per molecule. In one embodiment of the invention, $n$-butane is dehydrogenated to butene and butadiene containing product.

The catalyst systems of this invention are employed at temperatures between 600° and 1,300° F., preferably between 800° and 1,100° F, and at total pressures in the range of 0 to 500 psig, preferably 50 to 350 psig. Steam-to-hydrocarbon mole ratios of 0.5:1 to 30:1, preferably 2.5:1 to 20:1, are employed. Total space velocity (GHSV) of hydrocarbon and steam is between 100 and 50,000, preferably between 500 and 20,000 volumes of gas per volume of catalyst per hour (32° F, 0 psig pressure).

It was also discovered that in addition to the use of iron oxide as a means of extending dehydrogenation catalyst life, other Group VIII metal oxides, for example, cobalt oxide and nickel oxide, can also be used. It is believed that silica is the catalyst poison removed by the iron-oxide pretreatment bed, therefore any metal oxide capable of reacting with silica may be used. The use of these pre-treatment oxides (iron oxide) would also find utility in purifying steam used in high pressure turbo-electric generators in avoiding deposits of silica on turbine blades.

In the catalytic dehydrogenation of paraffins in the presence of steam, catalyst poisons such as silica can be found in varying amounts of both paraffins and steam feedstreams. Therefore, either the steam or paraffin feedstream can be individually pretreated before being combined and introduced to the dehydrogenation catalyst. However, a guard chamber can be located upstream of the catalyst bed, and both the paraffins and steam will pass through the guard chamber containing the iron oxide ($Fe_2O_3$).

The following examples provide a more complete understanding of the invention and are not to be limiting upon the scope of same. Examples I through III contain data which fully illustrate the advantages of using iron oxide as the guard chamber material. Example III utilizes $Fe_2O_3$ as the guard chamber material as compared to $Al_2O_3$ as used in Example I, and $ZnAl_2O_4 + SnO_2$ as used in Example II. The guard chamber material in each case was charged to the reactor immediately atop the catalyst. The reactor and guard chamber was comprised of a 1/4-inch stainless steel tube with an inside diameter of 0.31 inches. The catalyst used had a volume of 1.27 cubic centimeters The volume of guard chamber material used was 8 cubic centimeters of $Al_2O_3$ in Example I, 6 cubic centimeters of $ZnAl_2O_4 + $ 2 cubic centimeters of $SnO_2$, Example II, and 8 cubic centimeters of $Fe_2O_3$ as used in Example III. The feed (pure grade normal butane) and steam was downflowed so that the feedstream contacted the guard chamber material before contacting the catalyst. The guard chamber material was at the same temperature as the catalyst. Exemplary flow rates, temperature, pressure, and other physical conditions are hereinafter included in the three examples listed below.

|  | Example I [2] | Example II [2] | Example III [2] |
|---|---|---|---|
| Guard chamber material | $\alpha Al_2O_3$ | $ZnAl_2O_4 + SnO_2$ | $Fe_2O_3$ |
| Catalyst preparation: [1] | | | |
| Weight percent Pt | 0.4 | 0.2 | 0.2 |
| Weight percent Sn | 0.4 | 0.2 | 0.4 |
| Weight catalyst charged, g | 1.35 | 1.35 | 1.35 |
| Average feed rate, GHSV | 8,440 | 8,470 | 7,950 |
| Temperature, °F | 1,100 | 1,100 | 1,100 |
| Pressure, p.s.i.g. | 100 | 100 | 100 |
| Average steam mole ratio | 8.6 | 9.0 | 10.4 |

| Cycle | Hrs. total | Percent conv. | k | Percent conv. | k | Percent conv. | k |
|---|---|---|---|---|---|---|---|
| 1 | 0–8 | 11.8 | 3,310 | 13.4 | 3,650 | 20.0 | 6,175 |
| 2 | 8–16 | 9.0 | 2,385 | 16.2 | 5,495 | 21.0 | 9,035 |
| 3 | 16–24 | 8.9 | 2,500 | 14.9 | 5,085 | 18.1 | 6,915 |
| 5 | 32–40 | 7.6 | 1,930 | 12.6 | 3,955 | 17.0 | 4,765 |
| 7 | 48–56 | 5.5 | 1,205 | 9.8 | 2,670 | 15.2 | 4,030 |
| 9 | 64–72 | 4.5 | 965 | 9.8 | 2,410 | 16.1 | 4,640 |
| 12 | 88–96 | 3.4 | 645 | 6.0 | 1,420 | 16.9 | 4,820 |
| 15 | 112–120 | | | | | 16.9 | 4,780 |
| 20 | 152–160 | | | | | 17.3 | 5,455 |
| 25 | 192–200 | | | | | 16.0 | 3,040 |
| 30 | 232–240 | | | | | 15.5 | 4,130 |
| 36 | 280–288 | | | | | 16.4 | 4,425 |

[1] Preparation of butane dehydrogenation catalyst:
 a. Slurry an aqueous mixture of ZnO and Alon $Al_2O_3$ in a ball mill to achieve intimate mixing.
 b. Dry, grind and tablet.
 c. Calcine tablets at 1,800° F. for 3–8 hours.
 d. Regrind and screen to desired mesh size.
 e. Impregnate with aqueous solution of chlorplatinic acid and stannous chloride.
 f. Dry and calcine at 1,100–1,200° F. for 1–3 hours.

[2] Definition of reaction rate constant:
 $k = SX/[Xe(Xe-X)]$
where:
 S = butane gas hourly space velocity, vol./vol. cat./hr.
 Xe = equilibrium conversion determined by temperature and partial pressure of butane.
 Xe is approximately 0.6 in these tests.
 X = observed conversion of butane.

The above examples illustrate that when using the $Al_2O_3$ guard chamber material of Example I, the catalytic dehydrogenation process percent conversion was reduced to half within 48 to 56 hours. The $ZnAl_2O_4 + SnO_2$ guard chamber material of Example experienced a similar decline in percent conversion after 88 to 96 hours. The $Fe_2O_3$ guard chamber material of Example III experienced less than a 20 percent reduction in the percent conversion feature after operating from 192 to 200 hours. Since Example II utilized a guard chamber material very similar to the actual catalyst, the advantages of using $Fe_2O_3$ as a guard chamber material is self-evident.

A typical product composition, gas-phase product by mole percent is presented in Table I below.

TABLE I
Typical Product Composition = Gas Phase Product — Mole %

| Component | Mole % |
|---|---|
| $N_2$ (1) | 8.53 |
| $H_2$ | 18.11 |
| CO | .08 |
| $CO_2$ | 1.59 |
| $CH_4$ | 1.81 |
| $C_2H_6/C_2H_4$ | 2.03 |
| $C_3H_8$ | .17 |
| $C_3H_6$ | .97 |
| $iC_4H_{10}$ | .07 |
| $nC_4H_{10}$ | 54.81 |
| $1-C_4H_8$ | 3.93 |
| $t-2-C_4H_8$ | 3.63 |
| $C-2-C_4H_8$ | 2.67 |
| $C_4H_6$ | 1.60 |
| | 100.00 |

(1) added for flushing purposes.

Reasonable variation and modification are possible within the scope of this disclosure, the essence of which is that there is provided a dehydrogenation process wherein a feedstream consisting essentially of parrafins-steam is pre-treated in the presence of a Group VIII metal oxide for the purposes of removing dehydrogenation catalyst poisons. Modifications and variations of the aforementioned invention will obviously become apparent to those skilled in the art and the illustrated details disclosed herein are not to be construed as imposing unnecessary limitations on the invention.

What we claim is:

1. In a process for dehydrogenating a paraffinic feedstream by contacting said feedstream under suitable dehydrogenation conditions in a first zone with a catalyst comprising a platinum and tin promoted zinc aluminate in the presence of steam, the improvement extending the useful life of said catalyst which comprises passing at least one of said feedstream and said steam into contact with a Group VIII metal oxide in a second zone prior to the introduction of said at least one of said feedstream and said steam into said first zone, the material thus passed into contact with said Group VIII metal oxide containing silica which is poisonous to said catalyst, to thereby at least partially remove said silica from said at least one of said feedstream and said steam before the contacting thereof with said catalyst.

2. A process in accordance with claim 1 wherein said steam and said feedstream are admixed, the resulting admixture is passed through said second zone in contact with said Group VIII metal oxide, and the thus treated admixture is then passed into said first zone for contact with said catalyst.

3. A process according to claim 2 wherein the Group VIII metal oxide is selected from the group consisting of iron, cobalt, and nickel oxides.

4. A process according to claim 2 wherein the Group VIII metal oxide is iron oxide having the formula $Fe_2O_3$.

5. A process according to claim 2 wherein the paraffin feedstream is comprised of aliphatic compounds having from two to about 12 carbon atoms per molecule.

6. A process according to claim 5 wherein the aliphatic compounds are comprised of butane.

7. A process according to claim 4 wherein the mole ratio of steam to paraffinic material in said second zone is in the range of about 0.5:1 to about 30:1, wherein the total space velocity of said admixture is in the range of about 100 to about 50,000 volume of gas (32° F, O psig) per volume of said catalyst per hour, wherein the temperature in said first zone is in the range of about 600° to about 1,300° F, and wherein the pressure in said first zone is in the range of about 0 to about 500 psig.

* * * * *